(12) United States Patent
Cameron et al.

(10) Patent No.: US 8,918,657 B2
(45) Date of Patent: Dec. 23, 2014

(54) SYSTEMS, DEVICES, AND/OR METHODS FOR MANAGING ENERGY USAGE

(75) Inventors: Kirk Cameron, Blacksburg, VA (US); Joseph Turner, Christiansburg, VA (US)

(73) Assignee: Virginia Tech Intellectual Properties, Blacksburg, VA (US)

( * ) Notice: Subject to any disclaimer, the term of this patent is extended or adjusted under 35 U.S.C. 154(b) by 799 days.

(21) Appl. No.: 13/061,565

(22) PCT Filed: Sep. 2, 2009

(86) PCT No.: PCT/US2009/055708
§ 371 (c)(1),
(2), (4) Date: Jun. 27, 2011

(87) PCT Pub. No.: WO2010/028028
PCT Pub. Date: Mar. 11, 2010

(65) Prior Publication Data
US 2011/0252248 A1    Oct. 13, 2011

Related U.S. Application Data

(60) Provisional application No. 61/095,179, filed on Sep. 8, 2008.

(51) Int. Cl.
*G06F 1/26*    (2006.01)
*G06Q 10/04*    (2012.01)
*G06Q 50/06*    (2012.01)

(52) U.S. Cl.
CPC ............... *G06Q 10/04* (2013.01); *G06Q 50/06* (2013.01)
USPC ........... 713/300; 713/310; 713/320; 713/321; 713/322; 713/323; 713/324; 713/330; 713/340

(58) Field of Classification Search
USPC ............... 713/300, 310, 320–324, 330, 340
See application file for complete search history.

(56) References Cited

U.S. PATENT DOCUMENTS

| | | |
|---|---|---|
| 4,811,204 A | 3/1989 | Fung |
| 5,337,408 A | 8/1994 | Fung et al. |
| 5,396,635 A | 3/1995 | Fung |
| 5,630,163 A | 5/1997 | Fung et al. |
| 5,634,073 A | 5/1997 | Collins |
| 5,634,112 A | 5/1997 | Thome et al. |
| 5,671,433 A | 9/1997 | Fung et al. |
| 5,701,433 A | 12/1997 | Moriarty et al. |
| 5,710,929 A | 1/1998 | Fung |
| 5,758,175 A | 5/1998 | Fung |
| 5,778,413 A | 7/1998 | Stevens et al. |
| 5,799,198 A | 8/1998 | Fung |
| 5,813,038 A | 9/1998 | Thome et al. |
| 5,822,610 A | 10/1998 | Fung et al. |
| 5,892,959 A | 4/1999 | Fung |
| 5,938,739 A | 8/1999 | Collins et al. |

(Continued)

*Primary Examiner* — M Elamin
(74) *Attorney, Agent, or Firm* — Michael Haynes PLC; Michael N. Haynes

(57) ABSTRACT

Certain exemplary embodiments can provide a system, machine, device, manufacture, circuit, and/or user interface adapted for, and/or a method and/or machine-readable medium comprising machine-implementable instructions for, activities that can comprise, based on a predicted non-zero future power requirement for performing one or more portions of an expected workload by a predetermined system, the predicted future power requirement based on a past power requirement for performing one or more portions of a known workload by the predetermined system, automatically causing a change from a first power state of the predetermined system to a second power state that does not violate a specification for performing the one or more portions of the expected workload.

23 Claims, 8 Drawing Sheets

(56) References Cited

U.S. PATENT DOCUMENTS

| | | |
|---|---|---|
| 5,940,816 A | 8/1999 | Fuhrer et al. |
| 5,960,459 A | 9/1999 | Thome et al. |
| 6,079,025 A | 6/2000 | Fung |
| 6,115,823 A | 9/2000 | Velasco et al. |
| 6,118,035 A | 9/2000 | Fung et al. |
| 6,258,990 B1 | 7/2001 | Chen |
| 6,313,366 B1 | 11/2001 | Ladwig et al. |
| 6,389,003 B1 | 5/2002 | Barroso et al. |
| 6,436,234 B1 | 8/2002 | Chen et al. |
| 6,483,888 B1 | 11/2002 | Boerstler et al. |
| 6,501,304 B1 | 12/2002 | Boerstler et al. |
| 6,506,703 B1 | 1/2003 | Kao et al. |
| 6,515,530 B1 | 2/2003 | Boerstler et al. |
| 6,529,082 B1 | 3/2003 | Boerstler et al. |
| 6,584,571 B1 | 6/2003 | Fung |
| 6,762,629 B2 | 7/2004 | Tam et al. |
| 6,763,458 B1 | 7/2004 | Watanabe et al. |
| 6,803,494 B1 | 10/2004 | Ladwig et al. |
| 6,808,790 B2 | 10/2004 | Chen et al. |
| 6,809,602 B2 | 10/2004 | Boerstler |
| 6,813,674 B1 | 11/2004 | Velasco et al. |
| 6,832,977 B2 | 12/2004 | You |
| 6,859,882 B2 | 2/2005 | Fung |
| 6,937,076 B2 | 8/2005 | Gomm |
| 6,956,793 B2 | 10/2005 | Ngo |
| 6,963,250 B2 | 11/2005 | Ngo et al. |
| 6,996,441 B1 | 2/2006 | Tobias |
| 7,002,420 B2 | 2/2006 | Ngo |
| 7,032,119 B2 | 4/2006 | Fung |
| 7,057,427 B2 | 6/2006 | Wadhwa et al. |
| 7,058,826 B2 | 6/2006 | Fung |
| 7,061,299 B2 | 6/2006 | Khan et al. |
| 7,080,267 B2 | 7/2006 | Gary et al. |
| 7,085,943 B2 | 8/2006 | Chun et al. |
| 7,100,060 B2 | 8/2006 | Cai et al. |
| 7,113,048 B2 | 9/2006 | Brown et al. |
| 7,128,270 B2 | 10/2006 | Silverbrook |
| 7,131,015 B2 | 10/2006 | Flautner et al. |
| 7,134,011 B2 | 11/2006 | Fung |
| 7,155,617 B2 | 12/2006 | Gary et al. |
| 7,174,468 B2 | 2/2007 | Gary et al. |
| 7,194,385 B2 | 3/2007 | Flautner et al. |
| 7,207,014 B2 | 4/2007 | Velasco et al. |
| 7,224,563 B2 | 5/2007 | Naffziger |
| 7,227,366 B2 | 6/2007 | Rozen |
| 7,227,404 B2 | 6/2007 | Mayega |
| 7,228,441 B2 | 6/2007 | Fung |
| 7,237,129 B2 | 6/2007 | Fung |
| 7,272,735 B2 | 9/2007 | Fung |
| 7,305,521 B2 | 12/2007 | Park |
| 7,308,591 B2 | 12/2007 | Dubinsky |
| 7,321,269 B2 | 1/2008 | Drake et al. |
| 7,321,942 B2 | 1/2008 | Flautner et al. |
| 7,340,378 B1 | 3/2008 | Floyd et al. |
| 7,345,944 B1 | 3/2008 | Jenkins, IV |
| 7,421,601 B2 | 9/2008 | Bose et al. |
| 7,421,610 B2 | 9/2008 | Mitra |
| 7,423,475 B2 | 9/2008 | Saha et al. |
| 7,437,581 B2 | 10/2008 | Grochowski et al. |
| 7,439,718 B2 | 10/2008 | Rozen et al. |
| 7,444,526 B2 | 10/2008 | Felter et al. |
| 7,463,096 B2 | 12/2008 | Chi et al. |
| 7,464,379 B2 | 12/2008 | Kanai et al. |
| 7,484,111 B2 | 1/2009 | Fung |
| 7,498,835 B1 | 3/2009 | Rahman et al. |
| 7,498,836 B1 | 3/2009 | Tuan |
| 7,498,839 B1 | 3/2009 | Jenkins, IV |
| 7,504,854 B1 | 3/2009 | Look et al. |
| 7,509,549 B2 | 3/2009 | Larson |
| 7,512,820 B2 | 3/2009 | Flautner |
| 7,512,822 B2 | 3/2009 | Fung |
| 7,516,350 B2 | 4/2009 | Chelstrom et al. |
| 7,523,373 B2 | 4/2009 | Russell et al. |
| 7,525,353 B2 | 4/2009 | Wadhwa |
| 7,533,003 B2 | 5/2009 | Floyd et al. |
| 7,533,283 B2 | 5/2009 | Fung |
| 7,542,360 B2 | 6/2009 | Rashed |
| 7,548,564 B2 | 6/2009 | Hyun et al. |
| 7,549,139 B1 | 6/2009 | Tuan |
| 7,552,350 B2 | 6/2009 | Fung |
| 7,558,976 B2 | 7/2009 | Fung |
| 7,562,239 B2 | 7/2009 | Fung |
| 7,562,332 B1 | 7/2009 | Tuan |
| 2001/0052077 A1 | 12/2001 | Fung |
| 2002/0004912 A1 | 1/2002 | Fung |
| 2002/0004913 A1 | 1/2002 | Fung |
| 2002/0004915 A1 | 1/2002 | Fung |
| 2002/0007463 A1 | 1/2002 | Fung |
| 2002/0007464 A1 | 1/2002 | Fung |
| 2002/0013691 A1 | 1/2002 | Warnes |
| 2002/0061012 A1 | 5/2002 | Thi |
| 2002/0062454 A1 | 5/2002 | Fung |
| 2002/0199129 A1 | 12/2002 | Bohrer |
| 2003/0070780 A1 | 4/2003 | Chen |
| 2003/0071691 A1 | 4/2003 | Boerstler |
| 2003/0120959 A1 | 6/2003 | Bohrer |
| 2003/0128140 A1 | 7/2003 | Xie |
| 2003/0131216 A1 | 7/2003 | Henkel |
| 2003/0187822 A1 | 10/2003 | Lefurgy |
| 2003/0188208 A1 | 10/2003 | Fung |
| 2003/0196126 A1 | 10/2003 | Fung |
| 2003/0200473 A1 | 10/2003 | Fung |
| 2003/0212879 A1 | 11/2003 | Henkel |
| 2004/0003309 A1 | 1/2004 | Cai |
| 2004/0005956 A1 | 1/2004 | You |
| 2004/0017234 A1 | 1/2004 | Tam |
| 2004/0025067 A1 | 2/2004 | Gary |
| 2004/0025068 A1 | 2/2004 | Gary et al. |
| 2004/0025069 A1 | 2/2004 | Gary |
| 2004/0111710 A1 | 6/2004 | Chakradhar |
| 2004/0123297 A1 | 6/2004 | Flautner |
| 2004/0139302 A1 | 7/2004 | Flautner |
| 2004/0190085 A1 | 9/2004 | Silverbrook |
| 2004/0190092 A1 | 9/2004 | Silverbrook |
| 2004/0233930 A1 | 11/2004 | Colby, Jr. |
| 2004/0243761 A1 | 12/2004 | Bohrer |
| 2004/0251936 A1 | 12/2004 | Gomm |
| 2004/0257723 A1 | 12/2004 | Naffziger |
| 2005/0015553 A1 | 1/2005 | Park |
| 2005/0055590 A1 | 3/2005 | Farkas |
| 2005/0055592 A1 | 3/2005 | Velasco |
| 2005/0057952 A1 | 3/2005 | Mayega |
| 2005/0060590 A1 | 3/2005 | Bradley |
| 2005/0071693 A1 | 3/2005 | Chun |
| 2005/0097228 A1 | 5/2005 | Flautner |
| 2005/0108582 A1 | 5/2005 | Fung |
| 2005/0110578 A1 | 5/2005 | Ngo |
| 2005/0110581 A1 | 5/2005 | Ngo |
| 2005/0125703 A1 | 6/2005 | Lefurgy |
| 2005/0131680 A1 | 6/2005 | Chazan |
| 2005/0168295 A1 | 8/2005 | Ngo |
| 2005/0174158 A1 | 8/2005 | Khan |
| 2005/0177755 A1 | 8/2005 | Fung |
| 2005/0254106 A9 | 11/2005 | Silverbrook |
| 2005/0289152 A1 | 12/2005 | Earl |
| 2006/0012409 A1 | 1/2006 | Wadhwa |
| 2006/0048106 A1 | 3/2006 | Citron |
| 2006/0053348 A1 | 3/2006 | Chelstrom |
| 2006/0055570 A1 | 3/2006 | Khan |
| 2006/0066316 A1 | 3/2006 | Rozen |
| 2006/0072253 A1 | 4/2006 | Rozen |
| 2006/0093788 A1 | 5/2006 | Behm |
| 2006/0103478 A1 | 5/2006 | Brown |
| 2006/0126492 A1 | 6/2006 | Hyun |
| 2006/0149985 A1 | 7/2006 | Dubinsky |
| 2006/0155415 A1 | 7/2006 | Lefurgy |
| 2006/0212863 A1 | 9/2006 | Warnes |
| 2006/0248324 A1 | 11/2006 | Fung |
| 2006/0248325 A1 | 11/2006 | Fung |
| 2006/0248358 A1 | 11/2006 | Fung |
| 2006/0248359 A1 | 11/2006 | Fung |
| 2006/0248360 A1 | 11/2006 | Fung |
| 2006/0248361 A1 | 11/2006 | Fung |
| 2006/0253715 A1 | 11/2006 | Ghiasi |

(56) References Cited

U.S. PATENT DOCUMENTS

| | | |
|---|---|---|
| 2006/0253717 A1 | 11/2006 | Fung |
| 2006/0259796 A1 | 11/2006 | Fung |
| 2006/0259797 A1 | 11/2006 | Fung |
| 2006/0265608 A1 | 11/2006 | Fung |
| 2006/0265609 A1 | 11/2006 | Fung |
| 2006/0288130 A1 | 12/2006 | Madukkarumukumana |
| 2006/0288241 A1 | 12/2006 | Felter |
| 2006/0288244 A1 | 12/2006 | Cai |
| 2007/0005625 A1 | 1/2007 | Lekatsas |
| 2007/0009067 A1 | 1/2007 | Michalak |
| 2007/0011421 A1 | 1/2007 | Keller, Jr. |
| 2007/0011476 A1 | 1/2007 | Flautner |
| 2007/0018737 A1 | 1/2007 | Drake |
| 2007/0022312 A1 | 1/2007 | Mitra |
| 2007/0040621 A1 | 2/2007 | Ngo |
| 2007/0085579 A1 | 4/2007 | Wallberg |
| 2007/0101173 A1 | 5/2007 | Fung |
| 2007/0113052 A1 | 5/2007 | Lu |
| 2007/0113105 A1 | 5/2007 | Campbell |
| 2007/0118722 A1 | 5/2007 | Lu |
| 2007/0124094 A1 | 5/2007 | Brey |
| 2007/0150893 A1 | 6/2007 | Grobman |
| 2007/0152739 A1 | 7/2007 | Banerjee |
| 2007/0157206 A1 | 7/2007 | Rakvic |
| 2007/0168055 A1 | 7/2007 | Hsu |
| 2007/0195787 A1 | 8/2007 | Alnuweiri |
| 2007/0198863 A1 | 8/2007 | Bose |
| 2007/0204137 A1 | 8/2007 | Tran |
| 2007/0226741 A1 | 9/2007 | Seshadri |
| 2007/0226795 A1 | 9/2007 | Conti et al. |
| 2007/0240006 A1 | 10/2007 | Fung |
| 2007/0245165 A1 | 10/2007 | Fung |
| 2007/0245285 A1 | 10/2007 | Wang |
| 2007/0250219 A1 | 10/2007 | Gaskins |
| 2007/0250736 A1 | 10/2007 | Gaskins |
| 2007/0255972 A1 | 11/2007 | Gaskins |
| 2007/0266268 A1 | 11/2007 | Abbo |
| 2007/0266385 A1 | 11/2007 | Flautner |
| 2007/0294557 A1 | 12/2007 | Dubinsky |
| 2008/0005707 A1 | 1/2008 | Papanikolaou |
| 2008/0012603 A1 | 1/2008 | Wadhwa |
| 2008/0018368 A1 | 1/2008 | Wadhwa |
| 2008/0024233 A1 | 1/2008 | Drake |
| 2008/0028249 A1 | 1/2008 | Agrawal |
| 2008/0036613 A1 | 2/2008 | Gaskins |
| 2008/0040563 A1 | 2/2008 | Brittain |
| 2008/0043560 A1 | 2/2008 | Ko |
| 2008/0055119 A1 | 3/2008 | Sadowski |
| 2008/0059813 A1 | 3/2008 | Khodorkovsky |
| 2008/0059823 A1 | 3/2008 | Balatsos |
| 2008/0082844 A1 | 4/2008 | Ghiasi |
| 2008/0082873 A1 | 4/2008 | Russell |
| 2008/0098254 A1 | 4/2008 | Altevogt |
| 2008/0106327 A1 | 5/2008 | Meijer |
| 2008/0117848 A1 | 5/2008 | Yang |
| 2008/0118506 A1 | 5/2008 | An |
| 2008/0119165 A1 | 5/2008 | Mittal |
| 2008/0120514 A1 | 5/2008 | Ismail |
| 2008/0129518 A1 | 6/2008 | Carlton-Foss |
| 2008/0136400 A1 | 6/2008 | Chi |
| 2008/0141047 A1 | 6/2008 | Riviere-Cazaux |
| 2008/0147357 A1 | 6/2008 | Truter |
| 2008/0152016 A1 | 6/2008 | Nagahara |
| 2008/0162637 A1 | 7/2008 | Adamczyk |
| 2008/0162770 A1 | 7/2008 | Titiano |
| 2008/0162965 A1 | 7/2008 | Marinas |
| 2008/0163017 A1 | 7/2008 | Larson |
| 2008/0164313 A1 | 7/2008 | Kotlarsky |
| 2008/0164317 A1 | 7/2008 | Kotlarsky |
| 2008/0165253 A9 | 7/2008 | Silverbrook |
| 2008/0165254 A1 | 7/2008 | Silverbrook |
| 2008/0165767 A1 | 7/2008 | Kubler |
| 2008/0174373 A1 | 7/2008 | Dai |
| 2008/0181157 A1 | 7/2008 | Aoki |
| 2008/0186083 A1 | 8/2008 | Rozen |
| 2008/0186794 A1 | 8/2008 | Clinton |
| 2008/0195876 A1 | 8/2008 | Priel |
| 2008/0201591 A1 | 8/2008 | Hu |
| 2008/0205317 A1 | 8/2008 | Piipponen |
| 2008/0208512 A1 | 8/2008 | Johns |
| 2008/0209243 A1 | 8/2008 | Ghiasi |
| 2008/0209245 A1 | 8/2008 | Becker |
| 2008/0209248 A1 | 8/2008 | Priel |
| 2008/0221826 A1 | 9/2008 | Johns |
| 2008/0222435 A1 | 9/2008 | Bolan |
| 2008/0222466 A1 | 9/2008 | Gonzalez |
| 2008/0229127 A1 | 9/2008 | Felter |
| 2008/0239857 A1 | 10/2008 | Rajan |
| 2008/0239858 A1 | 10/2008 | Rajan |
| 2008/0244281 A1 | 10/2008 | Felter |
| 2008/0253085 A1 | 10/2008 | Soffer |
| 2008/0256551 A1 | 10/2008 | Priel |
| 2008/0263348 A1 | 10/2008 | Zaltsman |
| 2008/0265674 A1 | 10/2008 | Rozen |
| 2008/0265966 A1 | 10/2008 | Millar |
| 2008/0272934 A1 | 11/2008 | Wang |
| 2008/0288796 A1 | 11/2008 | Nakamura |
| 2008/0295096 A1 | 11/2008 | Beaty |
| 2008/0301475 A1 | 12/2008 | Felter |
| 2008/0307240 A1 | 12/2008 | Dahan |
| 2008/0310099 A1 | 12/2008 | Monferrer |
| 2008/0320323 A1 | 12/2008 | Brittain |
| 2009/0002333 A1 | 1/2009 | Maxwell |
| 2009/0003114 A1 | 1/2009 | Priel |
| 2009/0003243 A1 | 1/2009 | Vaswani |
| 2009/0006873 A1 | 1/2009 | Bellofatto |
| 2009/0006901 A1 | 1/2009 | Brey |
| 2009/0015232 A1 | 1/2009 | Rozen |
| 2009/0021989 A1 | 1/2009 | Rashed |
| 2009/0022304 A1 | 1/2009 | Kubler |
| 2009/0024789 A1 | 1/2009 | Rajan |
| 2009/0024790 A1 | 1/2009 | Rajan |
| 2009/0024943 A1 | 1/2009 | Adler |
| 2009/0029645 A1 | 1/2009 | Leroudier |
| 2009/0030644 A1 | 1/2009 | Johns |
| 2009/0031156 A1 | 1/2009 | Barth |
| 2009/0034454 A1 | 2/2009 | Kubler |
| 2009/0037712 A1 | 2/2009 | Mallik |
| 2009/0048720 A1 | 2/2009 | Johns |
| 2009/0049220 A1 | 2/2009 | Conti |
| 2009/0049314 A1 | 2/2009 | Taha |
| 2009/0049318 A1 | 2/2009 | Bose |
| 2009/0054075 A1 | 2/2009 | Boejer |
| 2009/0059903 A1 | 3/2009 | Kubler |
| 2009/0063228 A1 | 3/2009 | Forbes, Jr. |
| 2009/0070508 A1 | 3/2009 | Hildebrand |
| 2009/0070797 A1 | 3/2009 | Ramaswamy et al. |
| 2009/0077358 A1 | 3/2009 | Shin |
| 2009/0077398 A1 | 3/2009 | Bland |
| 2009/0077407 A1 | 3/2009 | Akimoto |
| 2009/0080398 A1 | 3/2009 | Mahany |
| 2009/0083551 A1 | 3/2009 | Finkelstein |
| 2009/0089725 A1 | 4/2009 | Khan |
| 2009/0091370 A1 | 4/2009 | Kawasaki |
| 2009/0099806 A1 | 4/2009 | Johns |
| 2009/0099985 A1 | 4/2009 | Tesauro |
| 2009/0100276 A1 | 4/2009 | Rozen |
| 2009/0108899 A1 | 4/2009 | Bhatia |
| 2009/0112931 A1 | 4/2009 | Wang |
| 2009/0113088 A1 | 4/2009 | Illowsky |
| 2009/0113178 A1 | 4/2009 | Kim |
| 2009/0115469 A1 | 5/2009 | Cortadella |
| 2009/0115488 A1 | 5/2009 | Cortadella |
| 2009/0115503 A1 | 5/2009 | Cortadella |
| 2009/0116597 A1 | 5/2009 | Cortadella |
| 2009/0119552 A1 | 5/2009 | Chelstrom |
| 2009/0119621 A1 | 5/2009 | Cortadella |
| 2009/0119622 A1 | 5/2009 | Cortadella |
| 2009/0119631 A1 | 5/2009 | Cortadella |
| 2009/0125293 A1 | 5/2009 | Lefurgy |
| 2009/0132835 A1 | 5/2009 | Ehmann |
| 2009/0132840 A1 | 5/2009 | Talwar |
| 2009/0135215 A1 | 5/2009 | Silverbrook |
| 2009/0135232 A1 | 5/2009 | Silverbrook |

(56) References Cited

U.S. PATENT DOCUMENTS

| | | |
|---|---|---|
| 2009/0135752 A1 | 5/2009 | Su |
| 2009/0138219 A1 | 5/2009 | Bletsch |
| 2009/0143871 A1 | 6/2009 | Gao |
| 2009/0144566 A1 | 6/2009 | Bletsch |
| 2009/0144568 A1 | 6/2009 | Fung |
| 2009/0144572 A1 | 6/2009 | Rozen |
| 2009/0147610 A1 | 6/2009 | Shikata |
| 2009/0150693 A1 | 6/2009 | Kashyap |
| 2009/0156270 A1 | 6/2009 | Thompson |
| 2009/0157936 A1 | 6/2009 | Goss |
| 2009/0158060 A1 | 6/2009 | Vaajala |
| 2009/0158061 A1 | 6/2009 | Schmitz |
| 2009/0160986 A1 | 6/2009 | Moini |
| 2009/0167360 A1 | 7/2009 | Kajita |
| 2009/0171511 A1 | 7/2009 | Tolentino |
| 2009/0171646 A1 | 7/2009 | Silbermintz |
| 2009/0172424 A1 | 7/2009 | Cai |
| 2009/0177903 A1 | 7/2009 | Rozen |

SYSTEMS, DEVICES, AND/OR METHODS FOR MANAGING ENERGY USAGE

CROSS-REFERENCES TO RELATED APPLICATIONS

This application is a U.S. National Stage of international application PCT/US2009/055708 filed 2 Sep. 2009 which claims priority to, and incorporates by reference herein in its entirety, U.S. Provisional Patent Application 61/095,179, filed 8 Sep. 2008.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Figure 1:
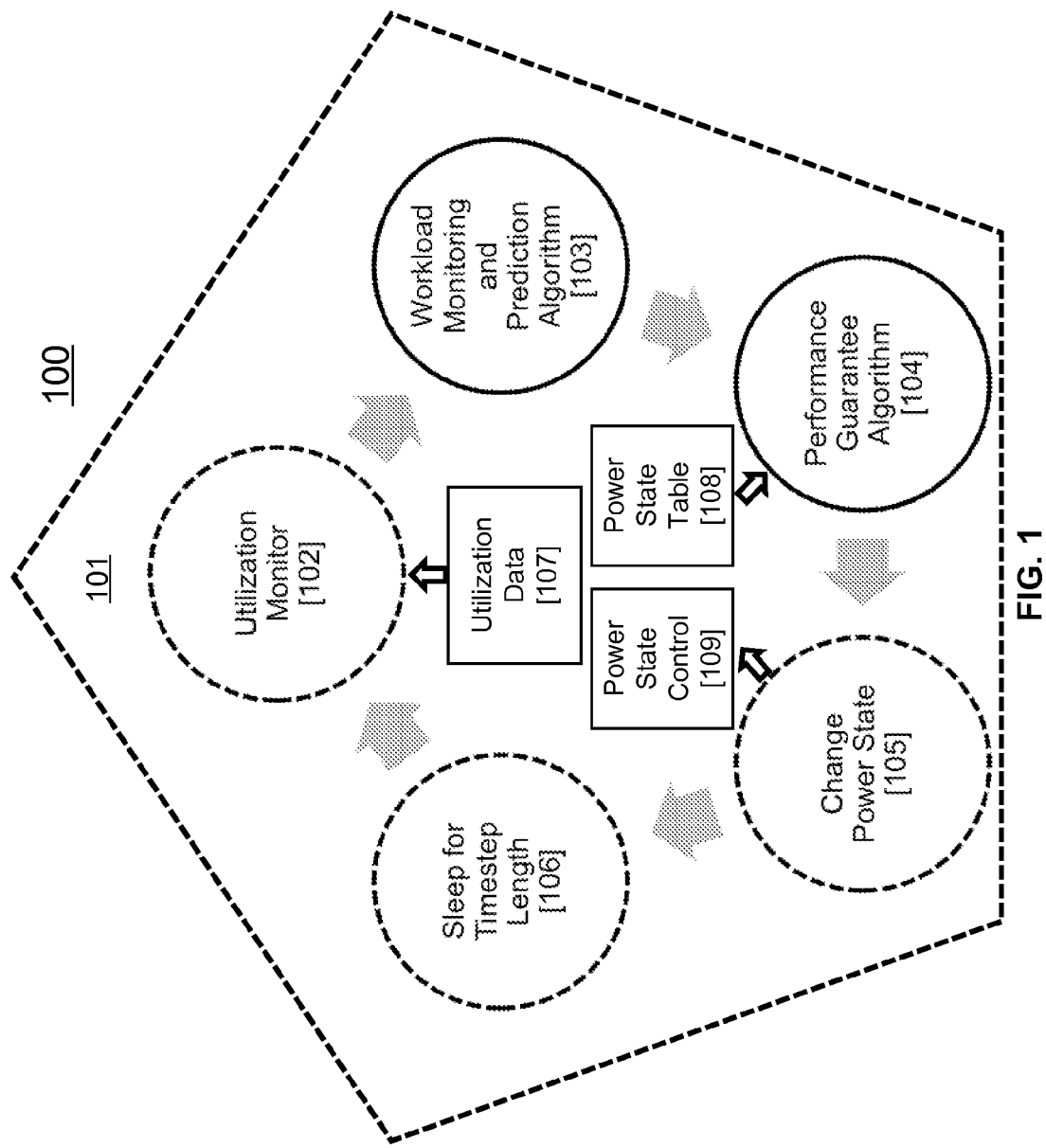
FIG. 1 is a dataflow diagram of an exemplary embodiment of one or more methods.

Data center professionals often require energy efficient servers in the data center. Data centers in the U.S. and abroad can be considered to provide the technological backbone for the Internet and e-commerce. As of 2005, data centers accounted for about 2% of total U.S. energy consumption, an amount that is projected to double in the next 5 years.

According to a 2006 survey conducted by AFCOM, a leading association for data center professionals, power and cooling are the top problem issues for data center professionals. AFCOM's Data Center Institute projects that by 2010, nearly half of all data center facilities will reach capacity, thereby requiring outsourcing or relocation. Nearly 30% of the 3,000 data center managers surveyed cited insufficient power and the excessive heat produced by systems as causes of their biggest problems. Of the outages in survey participants' data centers in the past 5 years, 81% were power-related and more than 50% of those surveyed said they had to add power to their facilities in the last two years.

Many data center professionals provide service level agreements (SLAs) to end customers under contractual obligations with financial penalties for violations. While many power management techniques such as virtualization and dynamic voltage and frequency scaling (DVFS) can save energy, the impact of these techniques on the service, availability, and performance of software running on the system is typically unknown and often compromised. Such tension can make data center professionals less likely to adopt power management software.

Certain exemplary embodiments can provide systems, devices, and/or methods for the autonomous control of the power states of computer systems and computer subsystems in such a way that does not affect the performance of the software running on the systems and subsystems. Certain exemplary embodiments can provide one or more systems, devices, and/or methods for the guaranteeing of performance, and/or incorporate the same into a usable system, device, and/or method for the control of power states.

In certain exemplary embodiments, a performance guarantee algorithm can transform the output of a workload modeling and prediction algorithm in such a way that deterministically bounds the performance loss based on a number of parameters. By bounding the performance loss in this way, certain exemplary embodiments can modify the power states of a system and/or subsystem while guaranteeing that the system and/or subsystem will not exceed a defined acceptable level of performance loss.

Certain exemplary embodiments can include monitoring utilization, workload modeling and prediction, guaranteeing performance, modifying the system or subsystem state, and sleeping for a specified timestep length (and/or sampling rate). More specifically, certain exemplary embodiments can include any of the following:

A. utilization monitoring and/or measuring the utilization of a system or subsystem for an identified workload;

B. workload characterization and/or transforming information about the workload on the system or subsystem into a discrete set of workload classes;

C. workload prediction and/or predicting the next workload class from the history of workload classes;

D. power state mapping and/or transforming workload classes into actual power states;

E. performance guaranteeing and/or transforming the power state output by the previous steps into one that can be affected without exceeding a performance setpoint;

F. affecting the power state change, in which the system or subsystem can be put into the chosen power state; and/or G. sleeping, in which the process can wait for a specified amount of time.

Via certain exemplary embodiments, the above mentioned performance guarantee algorithm can include any of the following:

A. estimation of the current performance loss caused by the power state changes thus far;

B. calculation of the available performance slack available based on the estimated current loss and the acceptable performance loss; and/or C. co-optimization of the chosen power state and the length of the next timestep (and/or sampling rate).

It can be appreciated that certain exemplary embodiments can allow and/or provide significant energy savings of a computer system and/or subsystem with a well-defined impact on the performance of the software running on the system and/or subsystem.

Moreover, certain exemplary embodiments can provide the capability to achieve significant energy savings in computing systems while guaranteeing performance. Certain exemplary embodiments can be considered to be the first to automatically control and bound the performance impact of any number of power management techniques. Though certain embodiments are illustrated using dynamic voltage and frequency scaling (DVFS) of the CPU, certain embodiments are broadly applicable to any power management scheme where device and/or system utilization can be monitored and power states can be controlled. This includes but is not limited to single and coordinated power management of devices (e.g., CPU's, memory devices, disks, network cards, and/or motherboards, etc.), full systems (e.g., laptops, servers, and/or PCs, etc.), networks of systems (e.g., subnets of PCs, servers, and/or laptops, etc.), and/or systems linked across the Internet. Certain exemplary embodiments can be accurate and flexible enough to provide "performance guarantees" or the ability to limit performance loss within user- or system-specified limits while reducing energy use. Users of certain exemplary embodiments can benefit from:

A. lower average operational costs;
B. increased thermal margins per chassis in data centers;
C. increased battery life for mobile devices;
D. provably correct, parameterized runtime control of power states; and/or
E. tunable techniques for predicting load in various user environments.

Certain exemplary embodiments can provide a system, machine, device, manufacture, circuit, and/or user interface adapted for, and/or a method and/or machine-readable medium comprising machine-implementable instructions for, activities that can comprise, based on a predicted non-zero future power requirement for performing one or more portions of an expected workload by a predetermined system, the predicted future power requirement based on a past power requirement for performing one or more portions of a known workload by the predetermined system, automatically causing a change from a first power state of the predetermined system to a second power state that does not violate a specification for performing the one or more portions of the expected workload.

Certain exemplary embodiments can provide for dynamic adaptive control of the power states of computer systems and/or their components while guaranteeing the performance of these systems and/or components. Certain exemplary embodiments can regulate the operating power mode of a computer system and/or subsystem based on the demand on that system and/or subsystem to reduce the energy consumption of the computer system.

A workload, such as a software workload, running on a computer system typically can be divided into distinct phases of operation. For each given phase, the utilization of the computer subsystems can be considered to be constant at some value based on the operations performed during that phase. For example, a workload for encoding video can be divided roughly into three phases that can be repeated throughout the course of the execution. In phase one, data can be read off of the hard disk into memory. In phase two, the data in memory can be analyzed. In phase three, the data in memory can be compressed into the new encoding. Each of these phases can be considered to have a unique utilization signature. Phase one can have a high level of disk access and memory access, and relatively low CPU usage. Similarly, phase two can have a high memory access rate and modest CPU utilization, with no disk usage. Finally, phase three can have high memory and CPU utilization, with no disk usage. Within these phases, the subsystem utilization signature can remain fairly constant.

By gathering data about the utilization and workload on the system, a workload model can be created that allows prediction of future workload phases based on the history of the workload. For a given computer subsystem and workload phase, the utilization of that subsystem can be predicted. As more time passes and more data is gathered, the model of the workload can be updated and refined to reflect changes in workload type and characteristics.

One application of the predictions of subsystem utilization can be predicting the demand on a given subsystem in order to scale the capability of the subsystem to match its demand. Such scaling can result in reduced power consumption of the computing subsystem and the system as a whole.

An example of such a method for scaling the capability of a subsystem is known as dynamic voltage and frequency scaling (DVFS), in which the operating frequency and voltage of the CPU are changed. This can result in a decrease in the power consumption of the processor, and thus of the entire computer system. Since DVFS can reduce the speed of the processor, placing the processor into a lower power state can have a deleterious effect on the performance of the software running on the computer. By predicting the utilization of the processor subsystem, good choices can be made for the DVFS mode of the processor.

Via certain exemplary embodiments, a novel performance guarantee algorithm can be applied to the output of the prediction algorithm to deterministically guarantee a performance bound.

FIG. 1 depicts an exemplary process 100 that can comprise several activities that can operate as a feedback loop 101 to make decisions about subsystem capabilities. In certain exemplary embodiments, time can be discretized into units called timesteps (and/or sampling rates). For each timestep (and/or sampling rate), the loop 101 depicted in FIG. 1 can be traversed and/or a new mode for the subsystem can be chosen.

The utilization monitor 102 can gather data about the utilization of the subsystem. This data can come in any of many forms, such as number of accesses for memory or disk, or the values of hardware performance counters for CPU, transactions per second for databases, bandwidth for networks, requests per second for e-commerce or Internet, system utilization for operating systems, frames per second for graphics cards, and/or user response time for interfaces, etc. The utilization monitor 102 then can transform the data into a form usable by the workload modeling and prediction algorithm 103.

Figure 2:
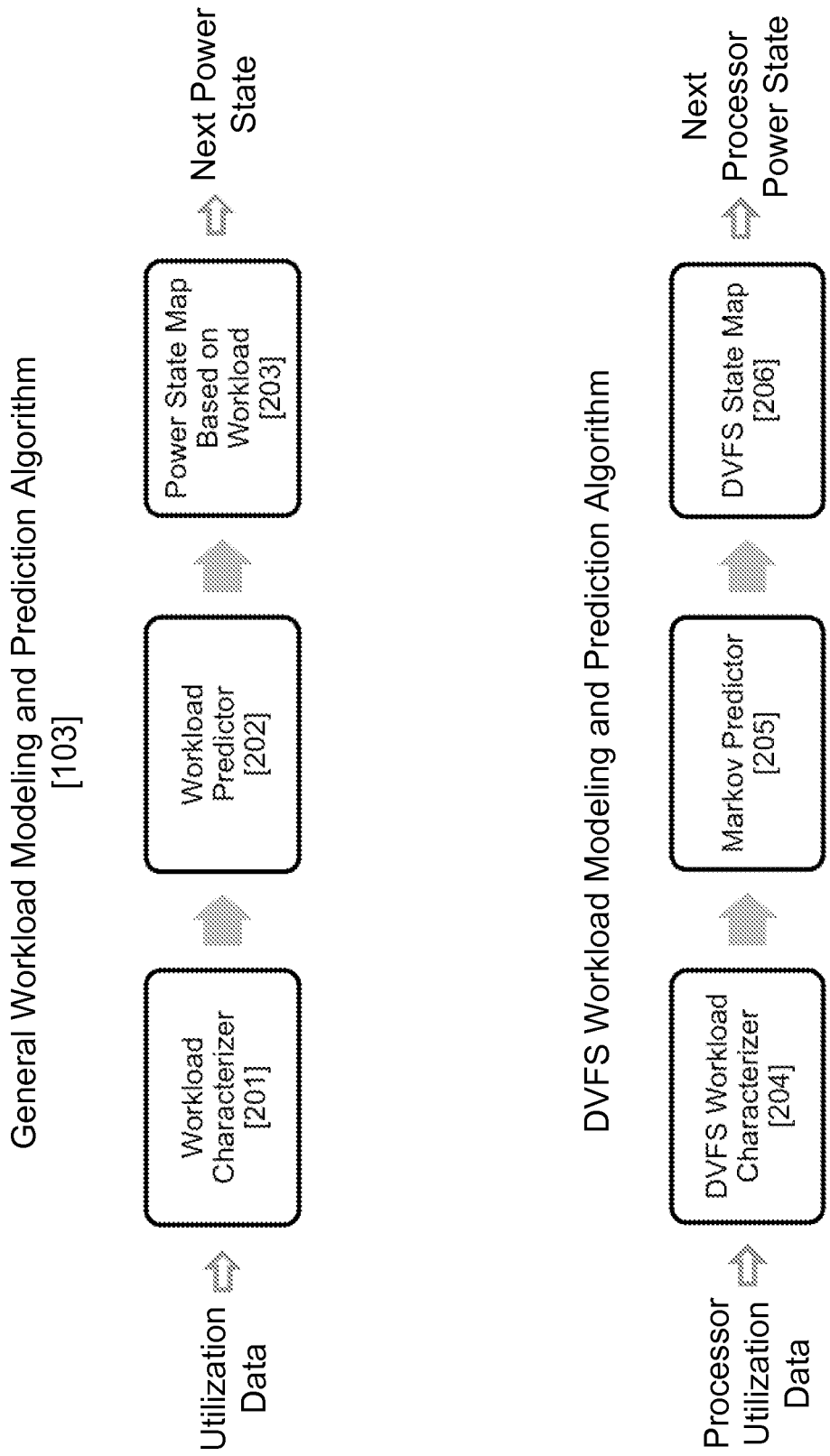
FIG. 2 is a dataflow block diagram of an exemplary embodiment of one or more methods for modeling and/or predicting workload.

A general workload modeling and prediction algorithm is shown in FIG. 2. The transformed utilization data from the utilization monitor 102 first can pass into the workload characterizer 201.

Figure 4:
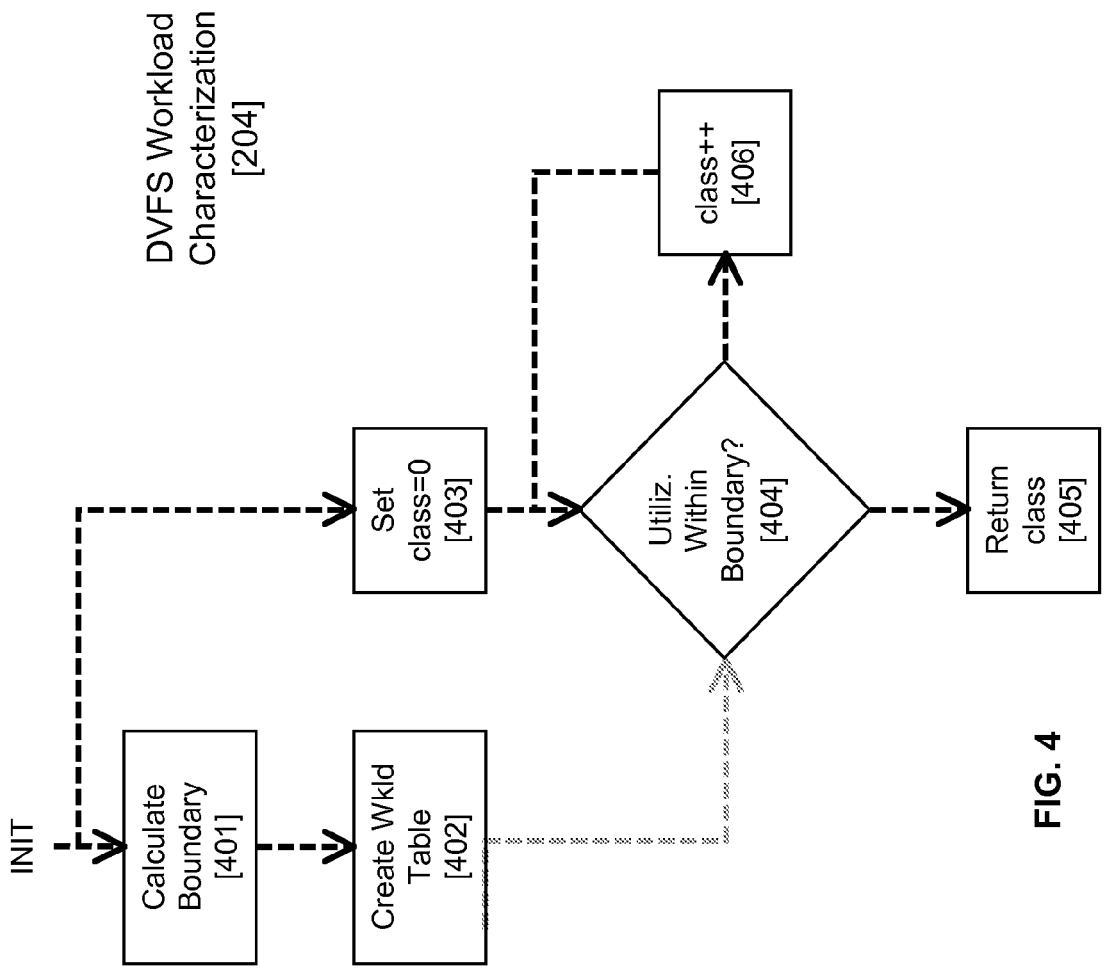
FIG. 4 is a flowchart of an exemplary embodiment of one or more methods for characterizing workload.

An exemplary embodiment of the general workload characterizer 201 is the DVFS utilization characterizer 204, depicted in FIG. 2 as a block module and in FIG. 4 in detail. This exemplary embodiment can characterize processor utilization based on the natural boundaries between the various DVFS modes. At initialization, the DVFS utilization characterizer 204 can take the available DVFS states of a processor and calculate the boundaries between the pairs of modes 401. From these calculated boundaries, it can create a workload class table 402 that can parameterize the different classes of workload for a given timestep (and/or sampling rate). The workload classes can be subunits of the workload phases; essentially, they can be the parameters for a given workload phase that has been discretized into timesteps (and/or sampling rates).

After initialization, the DVFS utilization characterizer 204 can begin to characterize processor utilization into the calculated workload classes. The utilization data from the utilization monitor 102 can pass to the DVFS utilization characterizer. The characterizer can begin execution by setting the class to the lowest available class 403, where "lower class" and "lower state" mean "lower power state". It then can check if the utilization is within the class boundaries computed during initialization 404. If so, the class can be returned 405. If not, it can increment 406 the class and repeat until it finds a suitable class for the utilization.

Referring again to FIG. 2, after the workload characterizer 201 produces a workload class, it can be passed to the workload predictor 202.

Figure 5:
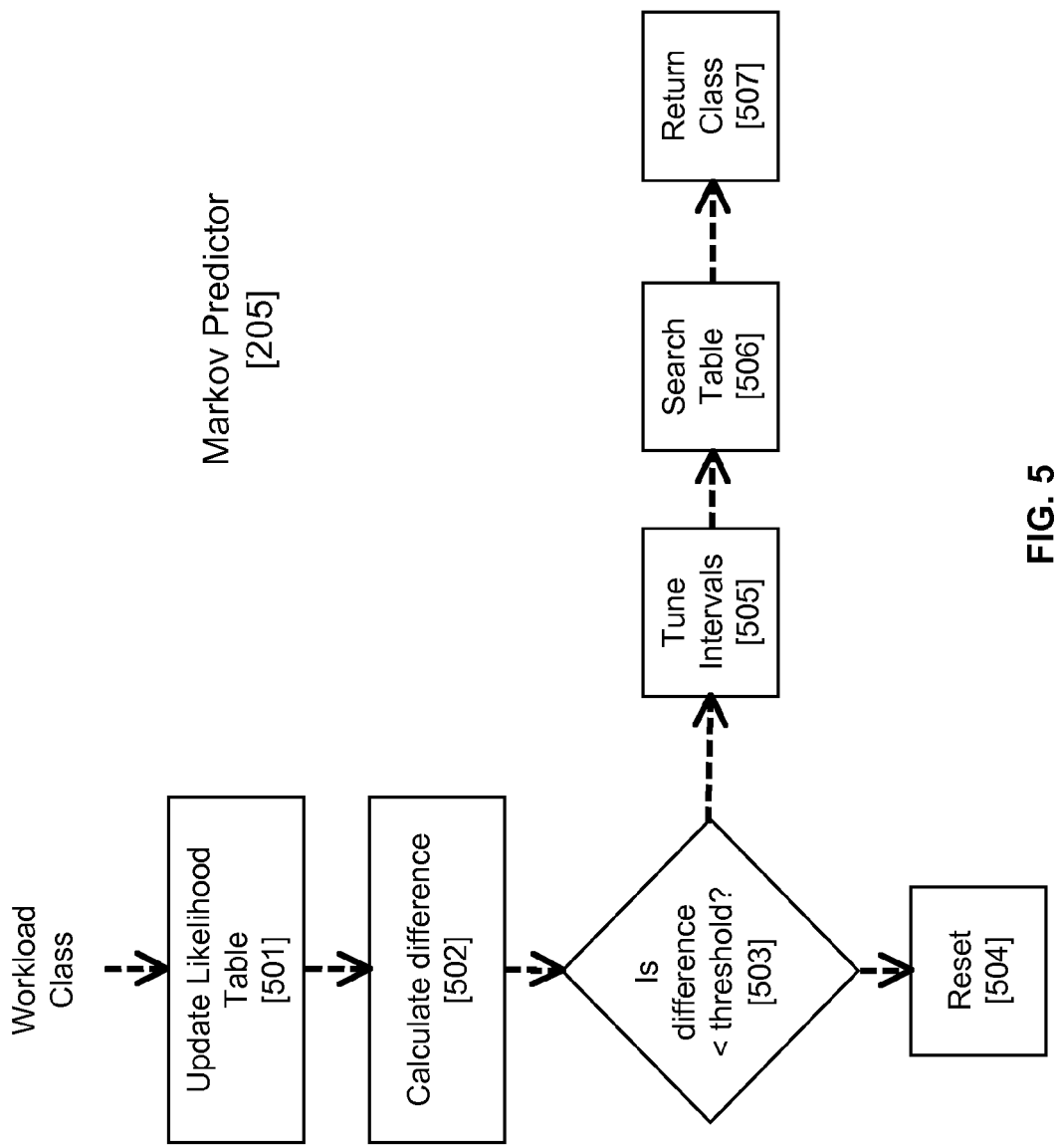
FIG. 5 is a flowchart of an exemplary embodiment of one or more methods for predicting workload.

An example of the workload predictor is the Markov predictor 205, depicted in FIG. 5. This example can predict workload based on the output of a simple Markov model of workloads. The assumption made by the Markov predictor 205 can be that the next workload class can be predicted based only on the current workload class. The process can take the current workload class from the workload characterizer 201 and can use it to update the likelihood table for the last workload class 501. It then can calculate the algorithm correctness 502 based on the last prediction and the actual value for this timestep (and/or sampling rate). It then can check the algorithm correctness 503; if the correctness is below the reset threshold, the probability tables can be reset 504. Afterwards, a specified percentage of the samples at the bottom of the probability table can be discarded 505 to remove potentially performance-harming low samples from the table. This can have the effect of smoothing out errors during the convergence of the algorithm. After discarding the samples, the likelihood table can be searched to locate the most likely next workload class 506. Finally, the next workload class chosen in 506 can be returned 507.

Referring to FIG. 2, this value then can be passed to the power state map 203. An example of the power state map can be the DVFS state map 206. This can be considered to be a simple mapping from workload classes to power states based on the mapping created in the DVFS utilization characterizer 204.

Referring again to FIG. 1, the output of the workload modeling and prediction algorithm then can be passed to the performance guarantee algorithm 104. The purpose of the performance guarantee algorithm can be to absolutely bound the performance impact of the process. It can do this by modifying the next chosen state output by the workload modeling and prediction algorithm. If the potential performance loss of the next timestep (and/or sampling rate) is larger than the allowable performance loss, at 105, the state can be transformed into a higher-power state with less or no potential for performance loss.

At 106, the process can wait for a specified amount of time specified by performance guarantee algorithm 104. System-specific and/or subsystem-specific data 107 about the utilization of the system and/or subsystem can be used by utilization monitor 102. System-specific and/or subsystem-specific data 108 about the available power states can be used by the performance guarantee algorithm to predict performance loss. A system-specific and/or subsystem-specific mechanism 109 for changing power states, such as a power state controller, can be used at 105 to affect changes in system and/or subsystem power states.

Figure 3:
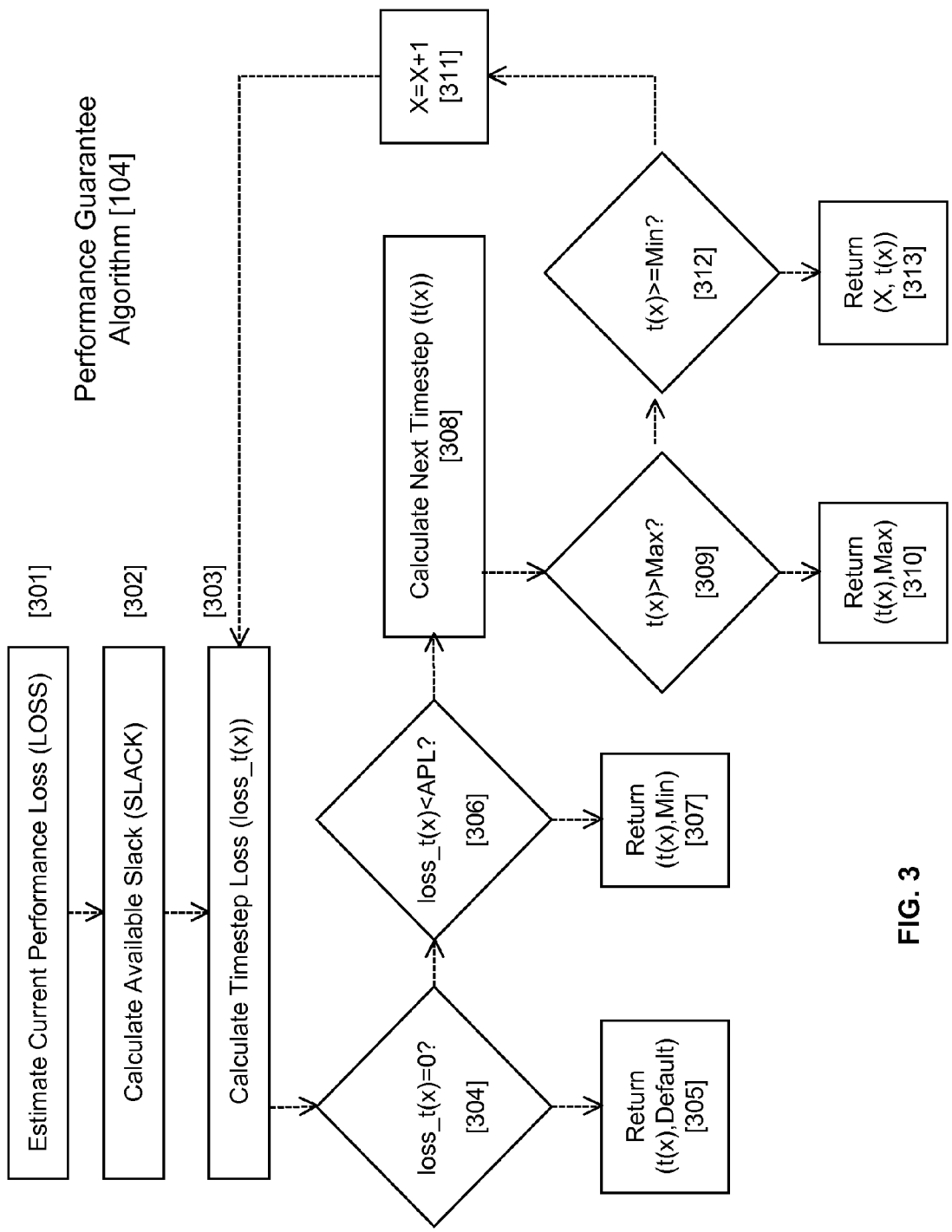
FIG. 3 is a flowchart of an exemplary embodiment of one or more methods for guaranteeing performance.

FIG. 3 is a depiction of an embodiment of the performance guarantee algorithm. This embodiment can be considered to be typical of the performance guarantee algorithm when used in the context of DVFS control. The algorithm can begin by estimating the current performance loss 301; that is, it can estimate, as a percentage, the amount of impact certain algorithms have had on the performance of software running on the system. For instance, in the case of DVFS, this can be the percentage of instructions that could have executed if the system had run at full frequency, but could not be executed due to the lowering of the frequency. As additional examples, performance loss can be based on and/or reflect, in the case of memory, a number of memory accesses that could not be made due to a lower power state. In the case of disk storage, performance loss can be a function of, e.g., number of disk accesses that couldn't be made due to a lower power state. For a network, performance loss can be dependent on and/or a measure of, for example, a number of bytes that could not be transmitted due to a lower power state. The performance loss value can refer to the performance loss of the entire execution of the process, or of a fixed-length window of time. Note that an embodiment of this algorithm typically does not under-predict this value, or else the quality of the guarantee might be compromised.

After the current performance loss has been estimated, the distance between the current performance loss and the acceptable performance loss can be calculated as the performance slack 302. The acceptable performance loss can be user definable and/or automatically defined. The slack can represent the amount of performance loss that can be incurred in the next timestep (and/or sampling rate). An example of the slack in the context of DVFS can be the number of instructions that are permitted to fail to execute without the performance loss being greater than the acceptable performance loss.

After calculating the available performance slack, the algorithm can enter a loop where it can co-optimize the next timestep length (and/or sampling rate) and the chosen power state. First, the projected performance loss for the state output by the workload modeling and prediction algorithm can be calculated 303. In the context of DVFS, this can be the percentage of instructions that would fail to be executed at the chosen state versus the full frequency state. Next, the projected loss can be analyzed for stopping cases. If the projected loss is zero 304, indicating that the chosen state is the full performance state, at 305, the algorithm can return the state with a default sampling rate and/or a default timestep. The default sampling rate and/or default timestep can be user definable and/or can be automatically chosen. If the projected loss ($loss\_t(x)$) is less than the defined acceptable performance loss (APL) 306, indicating that this state is always acceptable for the given acceptable performance loss, the state can be returned with a defined minimum sampling rate and/or minimum timestep 307. Again, the minimum sampling rate and/or minimum timestep can be user defined or can be chosen automatically.

After the projected loss for the current state is analyzed for stopping conditions, if no stopping condition is found, at 308, the algorithm can calculate the next timestep length ($t(x)$) (and/or sampling rate) as a function of the projected performance loss of the given state and the slack calculated in 302. In the context of DVFS, the process can be similar to what follows. The slack calculated in 302 can be a number of instructions that are permitted to fail to be executed without exceeding the defined acceptable performance loss. The projected performance loss calculated in 303 can be a percentage of instructions that are permitted to fail to be executed at a given state. By multiplying the output of 303 by a timestep and the number of instructions executed per unit of time, a number of instructions that are permitted to fail to execute at a given state for a given timestamp can be obtained. By rearranging the terms, the timestep with the given slack and the given state can be calculated. Specifically, the timestep length that is acceptable for the given slack and the given state can equal the slack divided by the quantity equal to the projected loss for the given state multiplied by the instruction rate. Similarly, a number of instructions that are permitted to fail to execute at a given state for a given sampling rate can be obtained.

After the prospective timestep length and/or prospective sampling rate is calculated in 308, it can be compared for stopping conditions. First, at 309, the prospective sampling rate and/or prospective timestep length can be compared to a maximum sampling rate and/or maximum timestep length, respectively. The maximum sampling rate and/or maximum timestep length can be user defined and/or can be chosen automatically. If the prospective timestep is longer than the maximum timestep length (or the prospective sampling rate is greater than the maximum sampling rate), at 310, the current state can be returned with the maximum timestep length (or maximum sampling rate). If it is not longer than the maximum timestep length (or maximum sampling rate), the prospective timestep length (or prospective sampling rate) can be compared to the minimum timestep length 312 (or minimum sampling rate). If the prospective timestep (or prospective rate) is greater than or equal to the defined minimum timestep length (or minimum sampling rate), at 313, the chosen state can be returned with the chosen timestep length (or chosen sampling rate).

If the prospective timestep length (or prospective rate) is shorter than the defined minimum timestep length (or minimum sampling rate), though, it can mean that the chosen state is too performance harming to be selected within the bounds of the minimum and maximum timestep lengths (or minimum and maximum sampling rates). In this case, the chosen state can be incremented to the next higher performance state 311. In the context of DVFS, this can mean moving to the next higher available frequency. After the state is incremented, the new state can be passed back to 303 and the loop can begin again.

Referring back to FIG. 1, after a state and a timestep (or sampling rate) are chosen by the performance guarantee algorithm 104, the system or subsystem under control can be changed into the chosen power state 105. In the context of DVFS, this can mean setting the appropriate registers on the processor to change the voltage and frequency to the chosen value. This also can mean using operating system features to make the same change. In the context of disks, this can mean setting appropriate registers on the processor to change the voltage and frequency to the chosen value and/or using the operating system to control disk spin speeds, standby settings, etc. In the context of memory, this can mean setting appropriate registers on the processor to change the voltage and frequency to the chosen value and/or using the operating system to lower the power usage of individual dynamic inline memory modules and/or subcomponents thereof.

After the power state is changed in 105, the algorithm can sleep 106 for the chosen timestep length (or sampling rate) output by the performance guarantee algorithm 104. After the software returns from the sleep state, the process 100 again can go through the feedback loop 101 described above to choose the next power state.

In the preceding paragraphs, certain exemplary embodiments have been described that can operate on a CPU subsystem by affecting frequency modes using a process known as DVFS. Certain exemplary embodiments can be applied to hard drives using the low power modes available in these devices with appropriate small modifications to the algorithms to account for, e.g., different power modes, slack periods, response times, and/or granularity of monitoring data, without necessarily affecting the overall process. Similarly, certain exemplary embodiments can be applied to random access memory (RAM) devices with appropriate small modifications to the algorithms to account for, e.g., different power modes, slack periods, response times, and/or granularity of monitoring data, without necessarily affecting the overall process. Additionally, though the discussion above has focused on controlling the power modes of computing subsystems, certain exemplary embodiments can be equally capable of controlling the power modes of full computing systems, including, but not limited to, full system sleep states, powering systems fully on and off, and/or controlling the power of sets of systems within and across subnets, etc., such as controlling the power of one or more systems and/or devices communicatively coupled to a network, such as one or more disks, disk arrays, network equipment (e.g., routers, switches, hubs, bridges, gateways, etc.), handhelds, desktop computers, laptops, monitors, cameras, speakers, printers, scanners, fax machines, telephony equipment, programmable logic controllers, embedded controllers, appliances, etc.

Figure 6:
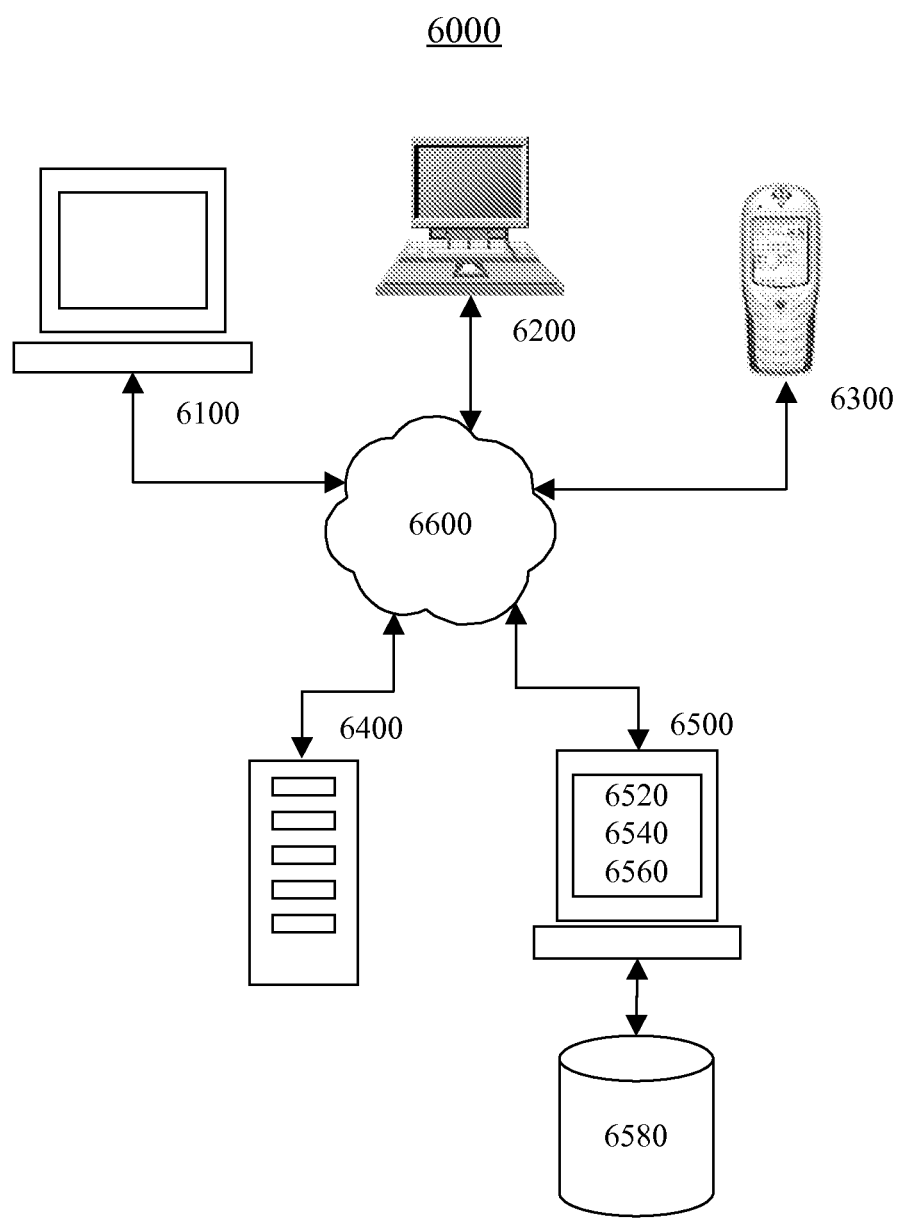
FIG. 6 is a block diagram of an exemplary embodiment of one or more systems.

FIG. 6 is a block diagram of an exemplary embodiment of a system 6000, which can comprise any number of information devices 6100, 6200, 6300, 6400, 6500, any of which can be communicatively coupled to any number of networks 6600. Any information device can be utilized as a personal computer, personal information device, smart phone, printer, scanner, router, server, embedded controller, etc. Any number of information devices, such as information device 6500, can include any number of energy utilizing components 6520 (such as a CPU, memory, disks, etc.), instructions 6540 (such as computer-readable and/or machine-readable instructions for implementing, such as via one or more predetermined processors, computers, and/or machines, any process, method, and/or algorithm described herein, such as instructions relating to energy management), one or more user interfaces 6560 (such as a graphical user interface, which can, e.g., receive user-entered instructions and/or data and/or report results of implementing instructions), and/or one or more storage mechanisms 6580 (such as one or more memories, disks, repositories, and/or databases, any of which can be adapted for storing instructions and/or data).

Figure 7:
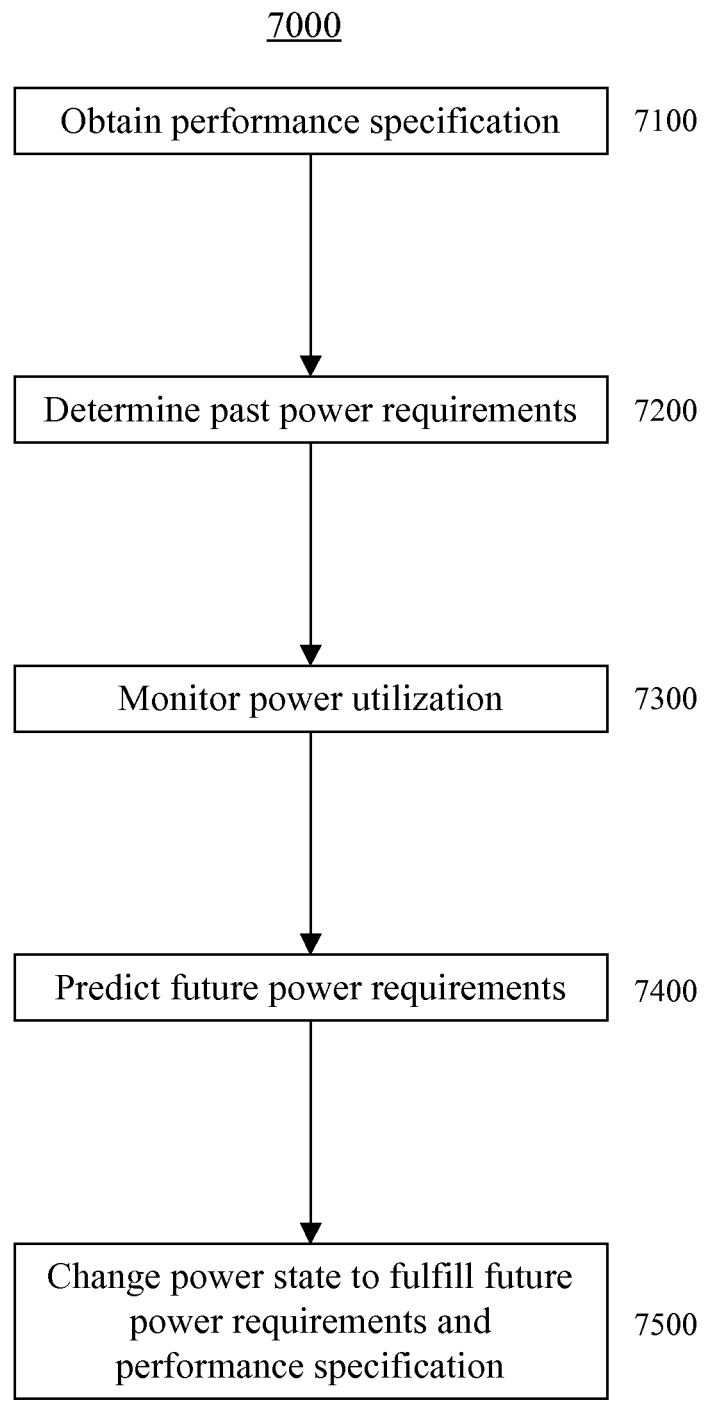
FIG. 7 is a flowchart of an exemplary embodiment of a method.

FIG. 7 is a flowchart of an exemplary embodiment of a method 7000. At activity 7100, a performance specification can be obtained. At activity 7200, past power requirements can be determined. At activity 7300, power utilization can be monitored. At activity 7400, future power requirements can be predicted. At activity 7500, a power state can be changed to fulfill the future power requirements and the performance specification.

Figure 8:
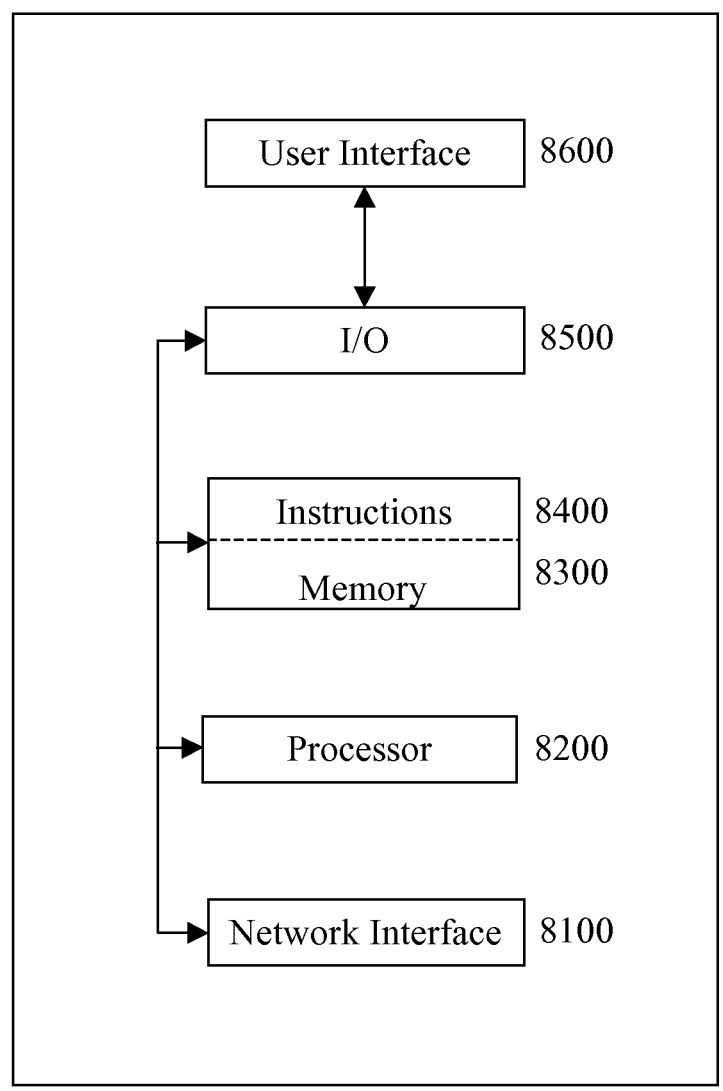
FIG. 8 is a block diagram of an exemplary embodiment of an information device.

FIG. 8 is a block diagram of an exemplary embodiment of an information device 8000, which in certain operative embodiments can comprise, for example, information device 6100, 6200, 6300, 6400, 6500, etc., of FIG. 6. Information device 8000 can comprise any of numerous transform circuits, which can be formed via any of numerous communicatively-, electrically-, magnetically-, optically-, fluidically-, and/or mechanically-coupled physical components, such as for example, one or more network interfaces 8100, one or more processors 8200, one or more memories 8300 containing instructions 8400, one or more input/output (I/O) devices 8500, and/or one or more user interfaces 8600 coupled to I/O device 8500, etc.

In certain exemplary embodiments, via one or more user interfaces 8600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, user interfaces, and/or information described herein.

Thus, certain exemplary embodiments can provide a system and/or device comprising a processor adapted for, a machine-readable medium comprising machine-implementable instructions for activities comprising, and/or a method comprising, via a predetermined processor:

based on a predicted non-zero future power requirement for performing one or more portions of an expected workload by a predetermined system, said predicted future power requirement based on a past power requirement for performing one or more portions of a known workload by said predetermined system:
automatically causing a change from a first power state of said predetermined system to a second power state that does not violate a guaranteed deterministically-bounded specification for performing said one or more portions of the expected workload;
dynamically adaptively controlling a power state of said predetermined system to a level that is sufficient to perform the expected workload yet prevents violation of the guaranteed deterministically-bounded performance specification;
receiving said specification;
automatically determining said past power requirement;
automatically monitoring power utilization for an identified workload;
automatically transforming information about power utilized when performing an identified workload into a discrete set of workload classes;
automatically predicting a next workload class from said set of workload classes;
transforming a next workload class into an actual power state;
identifying an amount to modify said actual power state to avoid violating said specification;
automatically predicting said future power requirement;
guaranteeing fulfillment of said future power requirement while incurring no greater than a user-specified performance loss;
automatically fulfilling said future power requirement while incurring no greater than a user-specified performance loss;
dividing a software process into a plurality of distinct workloads, each of said distinct workloads characterizable by a substantially constant power requirement;
identifying an available performance slack from an estimate of a current performance loss and an acceptable performance loss; and/or
co-optimizing a chosen power state and a length and/or magnitude of a next timestep (and/or sampling rate);
wherein:
said specification identifies a performance loss limit;
said specification deterministically bounds a user-specified performance loss;
said power state comprises an operating frequency;
said power state comprises a operating voltage; and/or
said predicted future power requirement is obtained via a Markov model.

DEFINITIONS

When the following terms are used substantively herein, the accompanying definitions apply. These terms and definitions are presented without prejudice, and, consistent with the application, the right to redefine these terms via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.
a—at least one.
about—around.
accept—to receive, approve, tolerate, and/or condone.
activity—an action, act, step, and/or process or portion thereof.
actual—real, realized, and/or existing; not merely potential or possible; based in reality; and/or measurable.
adapted—suitable, fit, and/or capable of performing a specified function.
adaptively—performing differently at different times.
amount—a quantity.
and/or—either in conjunction with or in alternative to.
apparatus—an appliance or device for a particular purpose
associate—to join, connect together, and/or relate.
automatically—acting or operating in a manner essentially independent of external influence or control. For example, an automatic light switch can turn on upon "seeing" a person in its view, without the person manually operating the light switch.
available—obtainable, not busy, not otherwise committed and/or accessible and/or ready for use and/or service.
avoid—to resist and/or try to prevent from happening.
based—being derived from.
Boolean logic—a complete system for logical operations.
bound—(n) a boundary, limit, and/or further extent of; (v) to limit an extent.
bound—to limit an extent.
can—is capable of, in at least some embodiments.
cause—to bring about, provoke, precipitate, produce, elicit, be the reason for, result in, and/or effect.
change—(v.) to cause to be different; (n.) the act, process, and/or result of altering or modifying.
characterizable—describable.
chosen—selected from a number of possible alternatives.
circuit—a physical system comprising: an electrically conductive pathway and/or a communications connection established across a switching device (such as logic gates); and/or an electrically conductive pathway and/or a communications connection established across two or more switching devices comprised by a network and between corresponding end systems connected to, but not comprised by the network.
class—a category and/or collection of things sharing a common attribute.
comprising—including but not limited to.
configure—to make suitable or fit for a specific use or situation.
constant—continually occurring; persistent; and/or unchanging.
containing—including but not limited to.
controlling—directing.
convert—to transform, adapt, and/or change.
co-optimize—to substantially simultaneously make optimal multiple variables.
create—to bring into being.
current—contemporaneous to the present time.
data—distinct pieces of information, usually formatted in a special or predetermined way and/or organized to express concepts, and/or represented in a form suitable for processing by an information device.
data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.

define—to establish the outline, form, or structure of determine—to find out, obtain, calculate, decide, deduce, ascertain, and/or come to a decision, typically by investigation, reasoning, and/or calculation.

deterministic—predictable, not random, and/or an inevitable consequence of antecedent sufficient causes. For example, deterministic algorithms solve problems with exact decisions at every step of the algorithm.

device—a machine, manufacture, and/or collection thereof.

digital—non-analog and/or discrete.

discrete—separate, distinct, and/or individual.

distinct—discrete and/or readily distinguishable from all others.

divide—to separate and/or segregate.

dynamically—on demand, as necessary, and/or in an interactive manner wherein a current state is dependent on a past and/or future input and/or output.

each—every one of a group considered individually.

estimate—(n) a calculated value approximating an actual value; (v) to calculate and/or determine approximately and/or tentatively.

expected—predicted and/or anticipated.

frequency—the number of times a specified periodic phenomenon occurs within a specified interval.

from—used to indicate a source.

fulfill—to carry out, effect, and/or complete.

further—in addition.

future—a time yet to come.

generate—to create, produce, give rise to, and/or bring into existence.

greater—larger and/or more than.

guarantee—to assure, make certain of, commit to fulfilling, and/or assume responsibility for.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

having—including but not limited to.

human-machine interface—hardware and/or software adapted to render information to a user and/or receive information from the user; and/or a user interface.

identification—evidence of identity, such as a moniker, description, designation, and/or characteristics, and/or something that uniquely and/or substantially uniquely identifies a person and/or thing.

identify—to specify, recognize, detect, and/or establish the identity, origin, nature, and/or definitive characteristics of.

including—including but not limited to.

incur—to experience and/or be liable for.

information—facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as an iPhone and/or Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

initialize—to prepare something for use and/or some future event.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

instructions—directions, which can be implemented as firmware and/or software, the directions adapted to perform a particular operation or function.

into—to a condition, state, or form of known—recognized or understood.

length—a longest dimension of something and/or the measurement of the extent of something along its greatest dimension.

level—a relative position on a scale and/or a position along a vertical axis indicating height and/or depth.

limit—a finite extent and/or point beyond which something cannot and/or may not proceed.

logic gate—a physical device adapted to perform a logical operation on one or more logic inputs and to produce a single logic output, which is manifested physically. Because the output is also a logic-level value, an output of one logic gate can connect to the input of one or more other logic gates, and via such combinations, complex operations can be performed. The logic normally performed is Boolean logic and is most commonly found in digital circuits. The most common implementations of logic gates are based on electronics using resistors, transistors, and/or diodes, and such implementations often appear in large arrays in the form of integrated circuits (a.k.a., IC's, microcircuits, microchips, silicon chips, and/or chips). It is possible, however, to create logic gates that operate based on vacuum tubes, electromagnetics (e.g., relays), mechanics (e.g., gears), fluidics, optics, chemical reactions, and/or DNA, including on a molecular scale. Each electronically-implemented logic gate typically has two inputs and one output, each having a logic level or state typically physically represented by a voltage. At any given moment, every terminal is in one of the two binary logic states ("false" (a.k.a., "low" or "0") or "true" (a.k.a., "high" or "1"), represented by different voltage levels, yet the logic state of a terminal can, and generally does, change often, as the circuit processes data. Thus, each electronic logic gate typically requires power so that it can source and/or sink currents to achieve the correct output voltage. Typically, machine-implementable instructions are ultimately encoded into binary values of "0"s and/or "1"s and, are typically written into and/or onto a memory device, such as a "register", which records the binary value as a change in a physical property of the memory device, such as a change in voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc. An exemplary register might store a value of "01101100", which encodes a total of 8 "bits" (one byte), where each value of either "0" or "1" is called a "bit" (and 8 bits are collectively called a "byte"). Note that because a binary bit can only have one of two different values (either "0" or "1"), any physical medium capable of switching between two saturated states can be used to represent a bit. Therefore, any physical system capable of representing binary bits is able to represent numerical quantities, and potentially can manipulate those numbers via particular encoded machine-implementable instructions. This is one of the basic concepts underlying digital computing. At the register and/or gate level, a computer does not treat these "0"s and "1"s as numbers per se, but typically as voltage levels (in the case of an electronically-implemented computer), for example, a high voltage of approximately +3 volts might represent a "1" or "logical true" and a low voltage of approximately 0 volts might represent a "0" or "logical false" (or vice versa, depending on how the circuitry is designed). These high and low voltages (or other physical properties, depending on the nature of the implementation) are typically fed into a series of logic gates, which in turn, through the correct logic design, produce the physical and logical results specified by the particular encoded machine-implementable instructions. For example, if the encoding request a calculation, the logic gates might add the first two bits of the encoding together, produce a result "1" ("0"+"1"="1"), and then write this result into another register for subsequent retrieval and reading. Or, if the encoding is a request for some kind of service, the logic gates might in turn access or write into some other registers which would in turn trigger other logic gates to initiate the requested service.

logical—a conceptual representation.

loss—a decline in amount and/or activity.

machine—a device and/or vehicle adapted to perform at least one task.

machine-implementable instructions—directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied and/or encoded as machine code, source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can store and/or obtain machine-implementable instructions, data, and/or information. Examples include a memory device, punch cards, etc.

Markov chain—a random process (Markov process) in which the probabilities of discrete states in a series depend only on the properties of the immediately preceding state or the next preceeding state, independent of the path by which the preceding state was reached.

Markov model—a model and/or simulation based on Markov chains.

may—is allowed and/or permitted to, in at least some embodiments.

memory device—an apparatus capable of storing, sometimes permanently, machine-implementable instructions, data, and/or information, in analog and/or digital format. Examples include at least one non-volatile memory, volatile memory, register, relay, switch, Random Access Memory, RAM, Read Only Memory, ROM, flash memory, magnetic media, hard disk, floppy disk, magnetic tape, optical media, optical disk, compact disk, CD, digital versatile disk, DVD, and/or raid array, etc. The memory device can be coupled to a processor and/or can store and provide instructions adapted to be executed by processor, such as according to an embodiment disclosed herein.

method—one or more acts that are performed upon subject matter to be transformed to a different state or thing and/or are tied to a particular apparatus, said one or more acts not a fundamental principal and not pre-empting all uses of a fundamental principal.

model—a mathematical and/or schematic description of an entity and/or system.

modify—to change, cause to change, edit, alter, replace, delete, and/or correct.

monitor—to observe.

network—a communicatively coupled plurality of nodes, communication devices, and/or information devices. Via a network, such nodes and/or devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, one or more network interfaces, and/or one or more information devices, such as a switch, router, and/or gateway not directly connected to a local area network, etc., and/or any equivalents thereof.

network interface—any physical and/or logical device, system, and/or process capable of coupling an information device to a network. Exemplary network interfaces comprise a telephone, cellular phone, cellular modem, telephone data modem, fax modem, wireless transceiver, communications port, ethernet card, cable modem, digital subscriber line interface, bridge, hub, router, or other similar device, software to manage such a device, and/or software to provide a function of such a device.

next—immediately following, as in time, order, or sequence.

non—not.

not—a negation of something.

obtain—to receive, get, take possession of, procure, acquire, calculate, determine, and/or compute.

operating—functioning.

packet—a generic term for a bundle of data organized in a specific way for transmission, such as within and/or across a network, such as a digital packet-switching network, and comprising the data to be transmitted and certain control information, such as a destination address.

past—a time that has occurred.

perceptible—capable of being perceived by the human senses.

perform—to begin, take action, do, fulfill, accomplish, carry out, and/or complete, such as in accordance with one or more criterion.

performance—operation, the act of performing, and/or the act of doing something successfully.

physical—tangible, real, and/or actual.

physically—existing, happening, occurring, acting, and/or operating in a manner that is tangible, real, and/or actual.

plurality—the state of being plural and/or more than one.

portion—a part, component, section, percentage, ratio, and/or quantity that is less than a larger whole. Can be visually, physically, and/or virtually distinguishable and/or non-distinguishable.

power—energy, a measure of energy and/or work, and/or a rate at which work is done, expressed as the amount of work per unit time and commonly measured in units such as watt and horsepower.

predetermined—established in advance.

predict—to prognosticate a future event.

prevent—to impede, hinder, stop, and/or keep from happening.

probability—a quantitative representation of a likelihood of an occurrence.

process—(n.) an organized series of actions, changes, and/or functions adapted to bring about a result. (v.) to perform mathematical and/or logical operations according to programmed instructions in order to obtain desired information and/or to perform actions, changes, and/or functions adapted to bring about a result.

processor—a hardware, firmware, and/or software machine and/or virtual machine physically adaptable to perform, via boolean logic operating on a plurality of logic gates, a specific task defined by a set of machine-implementable instructions. A processor can utilize mechanical, pneumatic, hydraulic, electrical, magnetic, optical, informational, chemical, and/or biological principles, mechanisms, adaptations, signals, inputs, and/or outputs to perform the task(s). In certain embodiments, a processor can act upon information by manipulating, analyzing, modifying, and/or converting it, transmitting the information for use by machine-implementable instructions and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium family of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

project—to calculate, estimate, or predict.

provide—to furnish, supply, give, and/or make available.

receive—to get as a signal, take, acquire, and/or obtain.

recommend—to suggest, praise, commend, and/or endorse.

render—to, e.g., physically, chemically, biologically, electronically, electrically, magnetically, optically, acoustically, fluidically, and/or mechanically, etc., transform information into a form perceptible to a human as, for example, data, commands, text, graphics, audio, video, animation, and/or hyperlinks, etc., such as via a visual, audio, and/or haptic, etc., means and/or depiction, such as via a display, monitor, electric paper, ocular implant, cochlear implant, speaker, vibrator, shaker, force-feedback device, stylus, joystick, steering wheel, glove, blower, heater, cooler, pin array, tactile touchscreen, etc.

repeatedly—again and again; repetitively.

request—to express a desire for and/or ask for.

require—to compel, demand, need, and/or request.

sampling rate—a number of samples obtained per a defined amount of time.

select—to make a choice or selection from alternatives.

server—an information device and/or a process running thereon, that is adapted to be communicatively coupled to a network and that is adapted to provide at least one service for at least one client, i.e., for at least one other information device communicatively coupled to the network and/or for at least one process running on another information device communicatively coupled to the network. One example is a file server, which has a local drive and services requests from remote clients to read, write, and/or manage files on that drive. Another example is an e-mail server, which provides at least one program that accepts, temporarily stores, relays, and/or delivers e-mail messages. Still another example is a database server, which processes database queries. Yet another example is a device server, which provides networked and/or programmable: access to, and/or monitoring, management, and/or control of, shared physical resources and/or devices, such as information devices, printers, modems, scanners, projectors, displays, lights, cameras, security equipment, proximity readers, card readers, kiosks, POS/retail equipment, phone systems, residential equipment, HVAC equipment, medical equipment, laboratory equipment, industrial equipment, machine tools, pumps, fans, motor drives, scales, programmable logic controllers, sensors, data collectors, actuators, alarms, annunciators, and/or input/output devices, etc.

set—a related plurality of elements; and/or one or more distinct items and/or entities having a specific common property or properties.

signal—automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc., that encode information, such as machine-implementable instructions for activities and/or one or more letters, words, characters, symbols, signal flags, visual displays, and/or special sounds, etc., having prearranged meaning Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

slack—a difference, interval, loss, and/or excess.

software—instructions executable on a machine and/or processor to create a specific physical configuration of digital gates and machine subsystems for processing signals.

special purpose computer—a computer and/or information device comprising a processor device having a plurality of logic gates, whereby at least a portion of those logic gates, via implementation of specific machine-implementable instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine-implementable instructions to the logic gate's specific configuration and property(ies). In the context of an electronic computer, each such change in the logic gates creates a specific electrical circuit, thereby directly tying the specific machine-implementable instructions to that specific electrical circuit.

special purpose processor—a processor device, having a plurality of logic gates, whereby at least a portion of those logic gates, via implementation of specific machine-implementable instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine-implementable instructions to the logic gate's specific configuration and property(ies). In the context of an electronic computer, each such change in the logic gates creates a specific electrical circuit, thereby directly tying the specific machine-implementable instructions to that specific electrical circuit.

specification—a description or characterization.

specify—to describe, provide, determine, characterize, indicate, and/or state explicitly and/or in detail.

state—a condition of an entity at an identified time.

statistically—with respect to statistics.

statistics—the science and/or mathematics of and/or dealing with the collection, organization, and/or interpretation of numerical data, especially the analysis of population characteristics by inference from sampling; and/or numerical information that has been collected, classified, and/or interpreted.

store—to place, hold, and/or retain data, typically in a memory.

substantially—to a considerable, large, and/or great, but not necessarily whole and/or entire, extent and/or degree.

sufficient—to a degree necessary to achieve a predetermined result.

system—a collection of mechanisms, devices, machines, articles of manufacture, processes, data, and/or instructions, the collection designed to perform one or more specific functions.

time—a measurement of a point in a nonspatial continuum in which events occur in apparently irreversible succession from the past through the present to the future.

timestep—a unit of time.

transform—to change, convert, and/or modify in measurable: form, appearance, nature, and/or character.

transmit—to send as a signal, provide, furnish, and/or supply.

user—a person, organization, process, device, program, protocol, and/or system that uses a device, system, process, and/or service.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

utilization—a use.

utilize—to use and/or put into service.

via—by way of, with, and/or utilizing.

violate—to exceed, transgress, disregard, act in disagreement with, and/or fail to fulfill.

voltage—(a.k.a., "potential difference" and "electro-motive force" (EMF)) a difference in electrical potential between any two conductors of an electrical circuit and/or a quantity, expressed as a signed number of Volts (V), and measured as a signed difference between two points in an electrical circuit which, when divided by the resistance in Ohms between those points, gives the current flowing between those points in Amperes, according to Ohm's Law.

weight—a value indicative of importance.

when—at a time.

wherein—in regard to which; and; and/or in addition to.

workload—one or more energy-utilizing activities.

yet—not thus far.

zero—at a point of origin of a coordinate system.

NOTE

Various substantially and specifically practical and useful exemplary embodiments of the claimed subject matter, are described herein, textually and/or graphically, including the best mode, if any, known to the inventors for carrying out the claimed subject matter. Variations (e.g., modifications and/or enhancements) of one or more embodiments described herein might become apparent to those of ordinary skill in the art upon reading this application. The inventors expect skilled artisans to employ such variations as appropriate, and the inventors intend for the claimed subject matter to be practiced other than as specifically described herein. Accordingly, as permitted by law, the claimed subject matter includes and covers all equivalents of the claimed subject matter and all improvements to the claimed subject matter. Moreover, every combination of the above described elements, activities, and all possible variations thereof are encompassed by the claimed subject matter unless otherwise clearly indicated herein, clearly and specifically disclaimed, or otherwise clearly contradicted by context.

The use of any and all examples, or exemplary language (e.g., "such as") provided herein, is intended merely to better illuminate one or more embodiments and does not pose a limitation on the scope of any claimed subject matter unless otherwise stated. No language in the specification should be construed as indicating any non-claimed subject matter as essential to the practice of the claimed subject matter.

Thus, regardless of the content of any portion (e.g., title, field, background, summary, description, abstract, drawing figure, etc.) of this application, unless clearly specified to the contrary, such as via explicit definition, assertion, or argument, or clearly contradicted by context, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

The use of the terms "a", "an", "said", "the", and/or similar referents in the context of describing various embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Moreover, when any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate subrange defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a U.S. patent, U.S. patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A method comprising:
via a predetermined processor:
based on a predicted non-zero future power requirement for performing one or more portions of an expected workload by a predetermined system, said predicted future power requirement based on a past power requirement for performing one or more portions of a known workload by said predetermined system, automatically causing a change from a first power state of said predetermined system to a second power state that does not violate a guaranteed deterministically-bounded explicit specification for performing said one or more portions of the expected workload, the specification requiring that the predetermined system will not exceed a user-defined acceptable level of performance loss.

2. The method of claim 1, further comprising:
receiving said specification.

3. The method of claim 1, further comprising:
automatically determining said past power requirement.

4. The method of claim 1, further comprising:
automatically monitoring power utilization for an identified workload.

5. The method of claim 1, further comprising:
automatically transforming information about power utilized when performing an identified workload into a discrete set of workload classes.

6. The method of claim 1, further comprising:
automatically transforming information about power utilized when performing an identified workload into a discrete set of workload classes; and
automatically predicting a next workload class from said set of workload classes.

7. The method of claim 1, further comprising:
transforming information about power utilized when performing an identified workload into a discrete set of workload classes;
predicting a next workload class from said set of workload classes; and
transforming a next workload class into an actual power state.

8. The method of claim 1, further comprising:
transforming information about power utilized when performing an identified workload into a discrete set of workload classes;
predicting a next workload class from said set of workload classes;
transforming a next workload class into an actual power state; and
identifying an amount to modify said actual power state to avoid violating said specification.

9. The method of claim 1, further comprising:
automatically predicting said future power requirement.

10. The method of claim 1, further comprising:
guaranteeing fulfillment of said future power requirement while incurring no greater than a user-specified performance loss.

11. The method of claim 1, further comprising:
automatically fulfilling said future power requirement while incurring no greater than a user-specified performance loss.

12. The method of claim 1, further comprising:
dividing a software process into a plurality of distinct workloads, each of said distinct workloads characterizable by a substantially constant power requirement.

13. The method of claim 1, further comprising:
identifying an available performance slack from an estimate of a current performance loss and an acceptable performance loss.

14. The method of claim 1, further comprising:
co-optimizing a chosen power state and a length of a next timestep.

15. The method of claim 1, further comprising:
co-optimizing a chosen power state and a magnitude of a next sampling rate.

16. The method of claim 1, wherein:
said specification identifies a performance loss limit.

17. The method of claim 1, wherein:
said specification deterministically bounds a user-specified performance loss.

18. The method of claim 1, wherein:
said power state comprises an operating frequency.

19. The method of claim 1, wherein:
said power state comprises a operating voltage.

20. The method of claim 1, wherein:
said predicted future power requirement is obtained via a Markov model.

21. A system comprising:
a processor adapted for:
based on a predicted non-zero future power requirement for performing an expected workload by a predetermined system, said predicted future power requirement based on a past power requirement for performing a known workload by said predetermined system, automatically causing a change from a first power state of said predetermined system to a second power state that is sufficient to perform the expected workload, yet that does not violate a guaranteed deterministically-bounded explicit performance specification, the specification requiring that the predetermined system will not exceed a user-defined acceptable level of performance loss.

22. A non-transitory machine-readable medium comprising machine-implementable instructions for activities comprising:
based on a predicted non-zero future power requirement for performing an expected workload by a predetermined system, said predicted future power requirement based on a past power requirement for performing a known workload by said predetermined system, automatically causing a change from a first power state of said predetermined system to a second power state that is sufficient to perform the expected workload, yet that does not violate a guaranteed deterministically-bounded explicit performance specification, the specification requiring that the predetermined system will not exceed a user-defined acceptable level of performance loss.

23. A method comprising:
via a predetermined processor:
based on a predicted non-zero future power requirement for performing an expected workload by a predetermined system, said predicted future power requirement based on a past power requirement for performing a known workload by said predetermined system, dynamically adaptively controlling a power state of said predetermined system to a level that is sufficient to perform the expected workload yet prevents violation of a guaranteed deterministically-bounded explicit performance specification, the specification requiring that the predetermined system will not exceed a user-defined acceptable level of performance loss.

* * * * *